United States Patent [19]

Wang

[11] Patent Number: 5,124,312
[45] Date of Patent: Jun. 23, 1992

[54] DRILLING FLUID THINNERS

[76] Inventor: Feng Wang, Room 1004, Dalian International Exhibition Centre. 1, Jiefang Street, Zhongshan District, Dalian, China

[21] Appl. No.: 683,688

[22] Filed: Apr. 11, 1991

[30] Foreign Application Priority Data

Apr. 16, 1990 [CN] China .................................. 90102081

[51] Int. Cl.$^5$ ................................................. C09K 7/02
[52] U.S. Cl. ..................................... 507/109; 530/500; 530/506; 507/108
[58] Field of Search ................ 507/108, 109; 530/500, 530/506

[56] References Cited

U.S. PATENT DOCUMENTS

| | | | |
|---|---|---|---|
| 3,091,588 | 5/1963 | Bishop | 252/8.51 |
| 3,232,925 | 2/1966 | King et al. | 252/8.51 |
| 3,278,425 | 10/1966 | King et al. | 252/8.51 |
| 3,544,460 | 12/1970 | Markham et al. | 252/8.51 |
| 3,700,728 | 10/1972 | Moschopedis et al. | 252/8.51 |
| 4,220,585 | 9/1980 | Javora et al. | 252/8.51 |
| 4,447,339 | 5/1984 | Detroit | 252/8.51 |
| 4,561,986 | 12/1985 | Villa et al. | 252/8.51 |
| 4,572,789 | 2/1986 | Uemura et al. | 252/8.51 |
| 4,594,169 | 6/1986 | Saito et al. | 252/8.51 |
| 4,704,214 | 11/1987 | Russell et al. | 252/8.514 |
| 4,728,727 | 3/1988 | Reintjes et al. | 530/500 |

FOREIGN PATENT DOCUMENTS 1276411  10/1970  United Kingdom .

Primary Examiner—Robert L. Stoll
Assistant Examiner—C. Sayala
Attorney, Agent, or Firm—Birch, Stewart, Kolasch & Birch

[57] ABSTRACT

The present invention relates to drilling fluid additives, more particularly to superior drilling fluid thinners or polyfunctional drilling fluid conditioners, and methods of their preparation. The thinners comprise chelates and complexes prepared by reaction of sulfonitrohumic acid and sulfolignin with compounds of elements of Groups IVB and VIII of the periodic table, and especially titanium zirconium iron sulfolignin sulfonitrohumates, as well as mixture formed in the reaction. These chelates are stable, and are readily binded with clay and have a good heat resistance. The thinners of the present invention can remarkably reduce viscosity, yield point, gel strength and water loss of well-drilling fluids, and have a high salts and calcium resistivity, and can be widely used in extracting and exploiting petroleum, natural gas, geothermal fluids and underground water.

12 Claims, No Drawings

DRILLING FLUID THINNERS

The present invention relates to new superior drilling fluid thinners, also methods of their preparation. The drilling fluid thinners of the present invention can be widely used in extracting and exploiting petroleum, natural gas, geothermal fluids and underground water.

BACKGROUND OF THE INVENTION

In rotary drilling technology, various drilling fluid additives have been employed to condition the performances of water-clay based drilling fluids, in an effort to remove drilling cuttings from bore hole, cool and lubricate the drill bit and drill stem, protect against blowouts by holding back subsurface pressure, deposit a thin and hard mud cake on the wall of the borehole to prevent loss of fluids to the formation or influx of subsurface fluids into the borehole, protect unstable shales by clay shell suppression effect of additives, prevent the bit from getting clogged, and suspend the cuttings when the bit stops and resume the flowability of drilling fluids. When the bit starts again. Such drilling fluid additives must remarkably reduce viscosity, yield point, gel strength and water loss of drilling fluids, give good rheology and thixotropy to drilling fluids.

An important method to control the aforementioned performances of drilling fluids is to add thinners to drilling fluids. Ferrochromelignosulfonates have been known as good thinners, which have contributed much in rotary well-drillings. However, as the noxious chrome contained therein may contaminate environment, ferrochromelignosulfonates are forbidden to be used in many countries by laws. Consequently, lignosulfonates not containing chrome have been developed.

As drilling fluid thinners, iron lignosulfonates, zirconium iron lignosulfonates and titanium iron lignosulfonates, and manganese iron lignosulfonates have been disclosed respectively in U.S. Pat. Nos 3,544,460; 4,220,585 and 4,447,389. But, the most serious shortcoming of these thinners is the thermal instability, their performances become obviously deteriorated when the temperature is higher than 150° C.

G.B.Pat. No. 1,276,411 discloses iron sulfohumate chelates, and J.P.-A-61-9487 discloses zirconium-iron-nickel-nitrohumates and lignosulfonates as drilling fluid thinners But, these thinners have a poor thermal stability, and their property to reduce viscosity at high temperature is not desirable.

U.S. Pat. No. 4,561,986 discloses a polymer composition containing about 80% by weight polyacrylic acid and about 20% by weight copolymer of itaconic acid and acrylamide as drilling fluid thinner. But these materials are quite expensive and are somewhat sensitive to certain environments such as those containing high concentration of salts of calcium and other alkali and alkaline earth metals, and their performances to reduce water-loss and shearing force in contaminated muds by seawater and gypsum are not evident.

Accordingly, an object of the present invention is to provide new superior drilling fluid thinners, which can remarkably reduce viscosity, yield point, gel strength and water loss of drilling fluids, condition highly efficiently the rheology and thixotropy of drilling fluids, have a high salts and calcium resistivity, and a high temperature resistivity, are chromium-free, nonpoisonous and less.

Another object of the present invention is to provide methods to prepare the drilling fluid thinners described above.

Further and other objects of the present invention will be more clearly understood from the following description of the invention.

SUMMARY OF THE INVENTION

The present invention provides a new superior drilling fluid thinner, characterized in that, the sulfonitrohumic acid and sulfolignin are reacted with compounds of elements of Groups IVB and VIII of the periodic table, especially with compounds of titanium, zirconium and iron, to form chelates and complexes of the elements with sulfonitrohumic acid and sulfolignin, as well as mixture of new compounds formed in the reaction.

The apparent viscosity or resistance to flow of drilling fluids is the result of two properties, plastic viscosity and yield point. Each of the two properties represents a different source of resistance to flow of drilling fluids. Plastic viscosity is a property related to the concentration of solids in the fluid, whereas yield point is a property related to the interparticle forces. Gel strength, on the other hand, is a property that denotes the thixotropy of mud at rest.

The sulfonitrohumic acids used in preparing the new superior drilling fluid thinners of the present invention contain large amounts of carboxyl, carbonyl, alcoholic hydroxyl, phenolic hydroxyl, nitro and sulfonic groups. The sulfolignins used in the present invention contain large amounts of carbonyl, alcoholic hydroxyl, phenolic hydroxyl and sulfonic groups. These curly macromolecules can readily react with different valent elements of Groups IVB and VIII of the periodic table, especially with titanium, zirconium and iron and so forth, to form stable chelates and complexes. These chelates and complexes of titanium zirconium iron sulfolignin sulfonitrohumates are anionic in charge and are good anionic surfactants. These chelates and complexes can be firmly attracted to the electrically charged clay particles, through neutralization of the charge on the clay particles, their interparticle forces can be reduced, and the rheology and thixotropy as well as water loss of the drilling fluids can be highly efficiently conditioned.

DETAILED DESCRIPTION OF THE INVENTION

As stated above, the present invention provides new superior drilling fluid thinners, wherein said thinners comprise chelates and complexes formed by reaction of sulfonitrohumic acid and sulfonated lignin with compounds of Groups IVB and VIII elements of the periodic table, more particularly titanium zirconium iron sulfolignin sulfonitrohumates, as well as mixtures of new compounds formed in the reaction.

The present invention also provides methods for preparing the drilling fluid thinners described above. The sulfonitrohumic acids and sulfonated lignins are reacted with compounds of elements of Groups IVB and VIII of periodic table in the presence of an oxidizer. Then the system pH is adjusted with aqueous alkali. The formed mixture is dried to obtain the thinners of the present invention.

1. SULFOLIGNIN

The sulfolignins used in the present invention are made from spent sulfite liquors and spent bisulfite liquors obtained in the pulp and paper industry The content of lignosulfonates is about 40–100%, preferably 85–100% by weight. The molecular weight of lignosulfonates is about 1000–125,000, preferably 40,000–120,000.

2. SULFONITROHUMIC ACID

First, nitrohumic acids are prepared by reaction of lignites with nitric acid in the presence of sulfuric acid and zinc sulfate. The particle size of lignites is more than 60 mesh, preferably more than 110 mesh. The content of humic acids is more than 20%, preferably more than 70% by weight. Based on the weight of lignites, the amount of 98% concentrated sulfuric acid is 2%; the amount of zinc sulfate is 0.2%; and the amount of nitric acid (as pure nitric acid) is 8–70%. The temperature of the reaction is in the range from ambient temperature to 90° C., preferably 45° C. The reaction time is from 10 minutes to 8 hours, preferably 1 hour.

Next, the sulfonitrohumic acids are prepared by reaction of nitrohumic acids with sodium hydroxide and sodium bisulfite. Based on the weight of nitrohumic acids, the amount of sodium hydroxide is 1–20%, preferably 7%; the amount of sodium bisulfite is 1–20%, preferably 7%. The temperature of the reaction is in the range of from 80° C. to 250° C., preferably 180° C.; the reaction time is from 0.5 to 10 hours, preferably 7 hours.

3. COMPOUNDS OF GROUPS IVB AND VIII ELEMENTS

Compounds of Groups IVB and VIII elements should be at least partially soluble in water Examples of such compounds include for example, sulfates, nitrates, carbonates, halides, hydroxides and oxides etc. Particular compounds are $Ti(SO_4)_2.4H_2O$, $TiOSO_4$, $TiCl_3.XH_2O$, $TiCl_4$, $Ri_2(SO_4)_3$, $Ti_2O_3$, $TiO_2$; $Zr(SO_4)_2.4H_2O$, $Zr(NO_3)_4.5H_2O$, $ZrOCl_2.8H_2O$, $ZrO$, $(NO_3)_2.H_2O$, $ZrCl_4$, $ZrOSO_4.4H_2O$, $ZrO(OH).(CH_3COO)$, $ZrO_2$; $FeSO_4.7H_2O$, $FeCl_2.4H_2O$, $Fe_2(SO_4)_3.XH_2O$ and $Fe_2O_3$ etc.

4. OXIDIZERS

The oxidizers used in the present invention have a standard oxidation potential of from 0.8 to 1.5. Examples of such oxidizers include, $H_2O_2$, $Cl_2$, $Br_2$ and alkali metal persulfate, etc..

5. METHODS FOR PREPARING NEW SUPERIOR DRILLING FLUID THINNERS

Sulfonitrohumic acids and sulfonated lignins are reacted with compounds of Groups IVB and VIII elements which are at least partially soluble in water, especially with compounds of titanium, zirconium and iron, in the presence of oxidizer. The reaction mixture is adjusted with sodium hydroxide to pH=7–10, and dried at temperature lower than 110 % to obtain drilling fluid thinner of the present invention. Based on the total weight of sulfonitrohumic acid and sulfonated lignin, the amount of sulfonated lignin therein is 5–95%, preferably 30–60% by weight: the amount of Groups IVB and VIII elements is 2–7%, preferably 3–5% by weight; the amount of oxidizer is 1–12%, preferably 3–5% by weight. The reaction temperature is 10°–100° C., preferably 60°–80° C.; The reaction time is 0.5–3 hours; The drying temperature is 40°–110° C., preferably <110° C.

6. EVALUATION OF THE DRILLING FLUID THINNERS

The performances of the drilling fluid thinners are evaluated in accordance with <API Recommended practice Standard Procedure for Field Testing Drilling Fluids>, Eleventh edition, May 1, 1985. The properties to be measured include apparent viscosity AV (cp), plastic viscosity PV (cp), yield point Yp (Lb/100 ft$^2$), gel strength G10″, G10′ (Lb/100 ft$^2$), Apl water loss (690+35 KPa, 25° C., unit ml), thickness of mud cake (mm), water loss at high temperature and high pressure (top pressure 4140 KPa, back pressure 690 KPa, temperature 150° C., unit ml).

The drilling fluid thinner of the present invention is added respectively to I#, II# and III# three different base muds, to obtain three different drilling fluids. They are compared with the drilling fluids formulated with a commercial ferrochrome lignosulfonate (CrFeLs) (available from Chemical Fiber Sizing Plant, KaiShan-Tun, China).

The amount of the drilling fluid thinner added is 1% by weight based on the base mud.

The ingredients of the three base muds are as follows:

I# base mud: water 1000 Kg, sodium carbonate anhydrous 7.2 Kg, bentonite 180 Kg.

II# base mud: water 1000 Kg, bentonite 80 Kg, barite powder 50 Kg, ground tuff 50 Kg, ground shale 50 Kg.

III# base mud: water 1000 Kg, calcium bentonite 380 Kg, gypsum 16 Kg, sodium chloride 12.9 Kg.

The results are summarized in Table I, II and III.

The following examples are provided to further illustrate the invention, but should not be regarded as limiting the invention in any way.

EXAMPLE 1

To the reactor charged with 100 ml water are added, under stirring, sulfonitrohumic acid 70 g, sulfonated lignin 80 g, zirconyl sulfate 7.6 g, ferrous sulfate 7.6 g and 28% hydrogen peroxide 11 g.

The reaction mixture is maintained at 80° C. for 1 hour with stirring, then cooled to 40° C. The mixture is adjusted with 50% aqueous sodium hydroxide to pH=9.5, and drilled at <100° C. to obtain a brownish black powder product.

EXAMPLE 2

To the reactor charged with 300 ml water are added, under stirring, sulfonitrohumic acid 70 g, sulfonated lignin 80 g, titanyl sulfate 12.8 g, ferrous sulfate 7 g and 28% hydrogen peroxide 15 g.

The reaction mixture is maintained at 80° C. for 1 hour with stirring, then cooled to 40° C., the mixture is adjusted with 50% aqueous sodium hydroxide to pH=9.6, and dried at 110° C. to obtain a brownish black powder product.

EXAMPLE 8

To the reactor charged with 300 ml water are added under stirring, sulfonitrohumic acid 70 g, sulfonated lignin 30 g, zirconium sulfate 8 g, titanyl sulfate 9.5 g, ferrous sulfate 6.6 g, and 28% hydrogen peroxide 15 g.

The reaction mixture is maintained at 80° C. for 1 hour with stirring, then cooled to 40° C. The mixture is adjusted with 50% aqueous sodium hydroxide to pH=9.5, and dried at temperature <110° C. to obtain a brownish black powder product.

EXAMPLE 4

To the reactor charged with 500 ml water and 100 g of 200 mesh lignite are added, under stirring, 98% concentrated sulphuric 2 g, zinc sulphate (98%) 0.2 g, and nitric acid (35%) 200 g. The reaction mixture is warmed slowly to 45° C., and maintained at this temperature for 1 hour.

The reaction mixture is then transferred to a autoclave, and sodium hydroxide 7 g and sodium bisulphite 7 g are added. And the final reaction mixture is maintained at 150° C. for 7 hours with stirring, dried at temperature <110° C., to obtain a brownish black sulfonitrohumic acid.

It is obvious that the drilling fluid thinners of the present invention have satisfactory thinning, deflocculating, and clay swell suppression effects, water loss preventing function as well as high salts and calcium resistivity and thermal stability. Therefore, the thinners of the present invention have much better performances than ferrochrome lignosulfonates, especially in reducing yield point, gel strength and water loss. And the drilling fluid thinners of the present invention exhibit an unparalleled excellent performance than the ferrochrome lignosulfonates do at high temperatures and high pressures. Hence, the thinners of the present invention can be used not only in shallow well drilling, but also in deep well drilling. The thinners of this invention can overwhelmingly take the place of ferrochrome lignosulfonate, sodium polyacrylate, modified sulfotannin, copolymer of acrylic acid, itaconic acid and acrylamide, and copolymer of maleic anhydride and sulfostyrene and so forth, in formulations of drilling fluids, in order to drill wells more efficiently.

The new superior drilling fluid thinners of the present invention can be widely used in extracting and exploiting petroleum, natural gas, geothermal fluids and underground water.

TABLE I

The effect of temperature on performance of drilling fluid additives

| | base mud | CrFeLs | Ex. I | Ex. II | Ex. III |
|---|---|---|---|---|---|
| | | ambient temperature | | | |
| PH | 9.5 | 9.5 | 9.5 | 9.5 | 9.5 |
| AV(CP) | 47.5 | 36 | 28 | 21 | 17 |
| PV(CP) | 24 | 25 | 20.5 | 18 | 15 |
| YP(Lb/100 ft²) | 47 | 22 | 15 | 6 | 4 |
| G10"(Lb/100 ft²) | 43 | 7 | 4 | 1 | 0 |
| G10'(Lb/100 ft²) | 47 | 10 | 4 | 1 | 1 |
| API water loss (ml) | 15 | 12 | 7 | 4.5 | 4.7 |
| Thickness of mud cake (mm) | 2 | 0.5 | 0.5 | 0.5 | 0.5 |
| HTHP water loss (ml) | >100 | 45 | 21 | 17.5 | 17.5 |

TABLE I-continued

The effect of temperature on performance of drilling fluid additives

| | base mud | CrFeLs | Ex. I | Ex. II | Ex. III |
|---|---|---|---|---|---|
| | Aged at 100° C. for 16 hours | | | | |
| PH | | | | | |
| AV(CP) | | 46.5 | 27 | 24 | 20 |
| PV(CP) | | 28 | 24 | 21 | 16 |
| YP(Lb/100 ft²) | | 37 | 6 | 6 | 4 |
| G10"(Lb/100 ft²) | | 24 | 2 | 2 | 1 |
| G10'(Lb/100 ft²) | | 26 | 5 | 3 | 1 |
| | Aged at 150 C. for 16 hours | | | | |
| PH | too | | | | |
| AV(VP) | thick | 77.5 | 32 | 27 | 21 |
| PV(CP) | to | 37 | 28 | 23.5 | 18.5 |
| YP(Lb/100 ft²) | measure | 81 | 8 | 7 | 5 |
| G10"(Lb/100 ft²) | | 48 | 4 | 2 | 2 |
| G10'(Lb/100 ft²) | | 59 | 7 | 5 | 3 |

CrFeLs represents ferrochrome lignosulfonate

TABLE II

Performance of drilling fluids formulated with II# base mud

| | II base mud | CrFeLs | Ex. I | Ex. II | Ex. III |
|---|---|---|---|---|---|
| | Ambient temperature | | | | |
| PV | 9.5 | 9.5 | 9.5 | 9.5 | 9.5 |
| AV(CP) | 82 | 41.5 | 31 | 24 | 21 |
| PV(CP) | 29.5 | 27 | 27.5 | 21.5 | 19 |
| YP(Lb/100 ft²) | 105 | 29 | 7 | 5 | 4 |
| G10"(Lb/100 ft²) | 115 | 14 | 2 | 1 | 1 |
| G10'(Lb/100 ft²) | 115 | 20 | 4 | 2 | 1 |
| API water loss (ml) | 27 | 14 | 8 | 5 | 6 |
| Thickness of mud cake (mm) | 2 | 0.5 | 0.5 | 0.5 | 0.5 |
| HTHP water loss | >110 | 53 | 23 | 18 | 17.5 |
| | Aged at 100° C. for 16 hours | | | | |
| PH | too | | | | |
| AV(CP) | thick | 42 | 32 | 24 | 23 |
| PV(CP) | to | 26.5 | 26 | 21.5 | 18.5 |
| YP(Lb/100 ft²) | measure | 31 | 12 | 7 | 5 |
| G10"(Lb/100 ft²) | | 17 | 4 | 2 | 1 |
| G10'(Lb/100 ft²) | | 23 | 4 | 2 | 2 |
| | Aged at 150° C. for 16 hours | | | | |
| PH | too | | | | |
| AV(CP) | thick | 93 | 34 | 28 | 25 |
| PV(CP) | to | 52 | 26.5 | 22.5 | 21.5 |
| YP(Lb/100 ft²) | measure | 82 | 15 | 11 | 7 |
| G10"(Lb/100 ft²) | | 72 | 5 | 3 | 2 |
| G10'(Lb/100 ft²) | | 95 | 8 | 5 | 3 |

CrFeLs represents ferrochrome lignosulfonate

TABLE III

Performance of drilling fluids formulated with sodium chloride contaminated III# base mud

| | Ambient temperature | | Aged at 100° C. for 16 hours | | Aged at 150° C. for 16 hours | |
|---|---|---|---|---|---|---|
| | CrFeLs | Ex. III | CrFeLs | Ex. III | CrFeLs | Ex. III |
| PH | 9.5 | 9.5 | 9.5 | 9.5 | 9.5 | 9.5 |
| AV(CP) | 32 | 24 | 31 | 25 | 51 | 28 |
| PV(CP) | 21.5 | 22 | 20 | 22.5 | 23 | 24.5 |
| YP(Lb/100 ft²) | 21 | 4 | 22 | 5 | 56 | 7 |
| G10"(Lb/100 ft²) | 5 | 1 | 7 | 2 | 42 | 3 |
| G10'(Lb/100 ft²) | 14 | 2 | 18 | 4 | 43 | 8 |

CrFeLs represents ferrochrome lignosulfonate

What is claimed is:

1. A drilling fluid thinner which comprises chelates and complexes of sulfolignin, sulfonitrohumic acid, and sulfolignin sulfonitrohumate with compounds of Groups IVB and VIII elements of the periodic table, wherein, based on the total weight of sulfonitrohumic acid and sulfolignin, the amount of sulfonitrohumic acid is 5-95% by weight, the amount of sulfolignin is 95-5% by weight; and the amount of Groups IVB and VIII elements is 2-7% by weight.

2. A drilling fluid thinner as claimed in claim 1, wherein said sulfonitrohumic acid is prepared by first oxidizing lignites with nitric acid at a temperature from ambient temperature to 90° C. for 1-8 hours, then sulfonating with sodium hydroxide and sodium bisulfite at a temperature from 80°-250° C. for 0.5-10 hours.

3. A drilling fluid thinner as claimed in claim 1, wherein said sulfolignin is prepared from spent sulfite liquors or spent bisulfite liquors obtained in pulp and paper industry, the content of lignosulfonates is 40-100% by weight; the molecular weight of lignosulfonates is 1000-125,000.

4. A drilling fluid thinner as claimed in claim 1, wherein said Groups IVB and VIII elements are selected from a group consisting of titanium, zirconium and iron.

5. A method for preparing the drilling fluid thinner as claimed in claim 1, which comprises reacting sulfonitrohumic acid and sulfonated lignin with compounds of Groups IVB and VIII elements of the periodic table at a temperature of 10°-100° C. for 0.5-3 hours in the presence of oxidizers, then adjusting the system with aqueous alkali to pH 7-11, and drying at a temperature of 40°-110° C. to obtain the drilling fluid thinner, wherein, based on the total weight of sulfonitrohumic acid and sulfonated lignin, the amount of sulfonitrohumic acid is 5-95% by weight, the amount of sulfolignin is 95-5% by weight, and the amount of Groups IVB and VIII elements is 2-7% by weight.

6. A method as claimed in claim 5, wherein said compounds of Groups IVB and VIII elements of the periodic table are compounds at least partially soluble in water, selected from the group consisting of sulfates, nitrates, carbonates, halides, hydroxides and oxides.

7. A method as claimed in claim 5, wherein said oxidizer has a standard oxidation potential 0.8-1.5, and is selected from a group consisting of $H_2O_2$, $Cl_2$, $Br_2$ and alkali metal persulfates.

8. The drilling fluid thinner according to claim 1, wherein said chelate and complex of sulfolignin sulfonitrohumate with Group IVB and VIII elements is titanium-zirconium-iron-sulfolignin-sulfonitrohumate.

9. A method as claimed in claim 6, wherein said compounds of Groups IVB and VIII elements of the periodic table are compounds selected from the group consisting of $Ti(SO_4).4H_2O_2$, $TiOSO_4$, $TiCl_3$, $XH_2O$, $TiCl_4$, $Ti_2(SO_4)_3$, $Ti_2O_3$, $TiO_2$; $Zr(SO_4)_2.4H_2O$, $Zr(HO_3)_4.5H_2O$, $ZrO(OH)(CH_3COO)$, $ZrO_2$; $FeSO_4.7H_2O$, $FeCl_2.4H_2O$, $FeCl_2(SO_4)_3.XH_2O$, and $Fe_2O_3$.

10. A method of preparing a drilling fluid thinner comprising:
   a. adding simultaneously sulfonitrohumic acid and lignosulfonic acid and compounds of Group IVB elements and compounds of Group VIII elements and an oxidizing agent to a reactor maintained at 10° C. to 100° C. for 1 hour while continuously;
   b. adjusting the pH to 7 to 10 with alkaline compounds;
   c. spray-drying the reactor contents to a powder at less than 110° C.

11. A method of preparing a drilling fluid thinner according to claim 10, wherein the reactor temperature is maintained at 60° C. to 80° C. and the pH is adjusted with NaOH.

12. A method of preparing a drilling fluid according to claim 10, wherein said sulfonitrohumic acid is obtained by preparing nitrohumic acid by the nitric acid oxidation and nitration of lignite in the presence of zinc sulfate and sulfuric acid at 45° C. and washing with water, wherein sulfonitrohumic acid is obtained by the sodium sulfite or sodium bisulfite sulfonation of nitrohumic acid in an alkali medium at 150° C.; wherein said lignosulfonic acid is obtained from spent sulfite liquor, the content being 40% to 100%, molecular weight being 1000 to 125,000, wherein said compounds of Groups IVB and VIII elements are sulfates, nitrates, carbonates, halides, hydroxides, oxides, and selected from the group consisting of $Ti(SO_4)_2.4H_2O$, $TiOSO_4$, $TiCL_3XH_2O$, $TiCl_4$, $Ti_2(SO_4)_3$, $Ti_2O_3$, $TiO_2$, $Zr(SO_4)_2.4H_2O$, $Zr(NO_3)_4.5H_2O$, $ZrOCl_2.8H_2O$, $ZrO(NO_3.2H_2O$, $ZrCl_4$, $ZrOSO_4.4H_2O$, $ZrO(OH).(CH_3COO)$; $ZrO_2$; $FeSO_4.7H_2O$, $FeCl_2.4H_2O$, $Fe_2(SO_4)_3.XH_2O$, and $Fe_2O_5$, wherein said oxidizing agent used in said reactor is hydrogen peroxide.

* * * * *